July 4, 1961    J. WILLIAMS    2,991,213
METHOD OF PRODUCING A JOINT FOR A STAINED GLASS WINDOW
Filed April 13, 1959
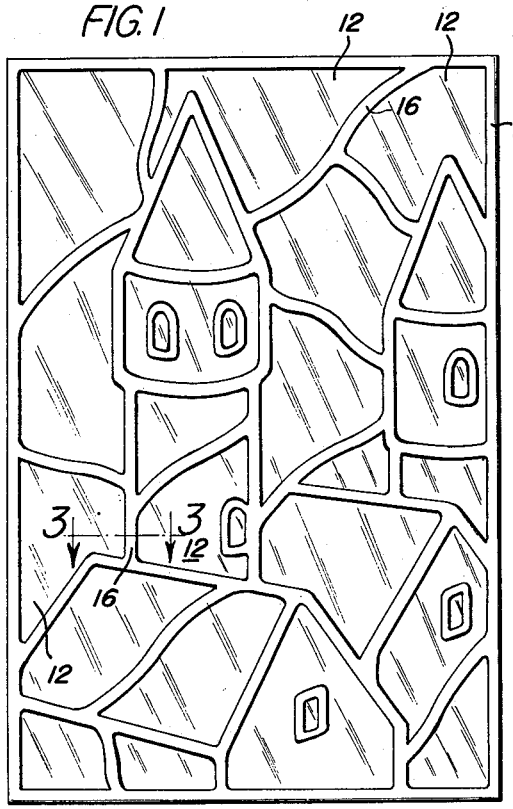
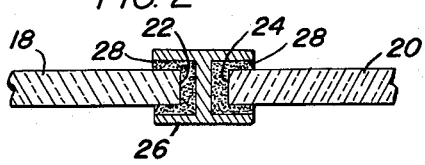
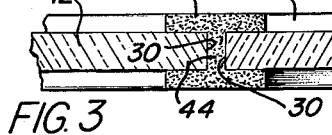
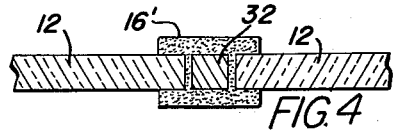
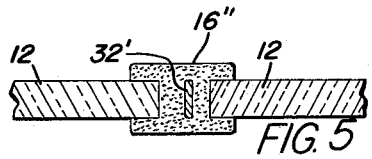
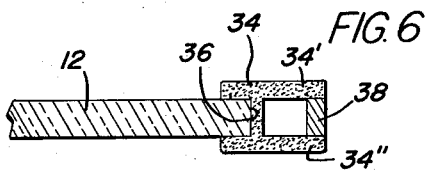
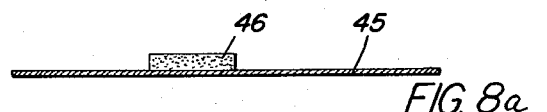
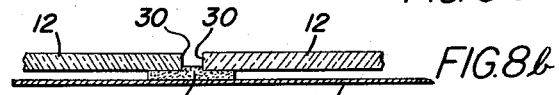
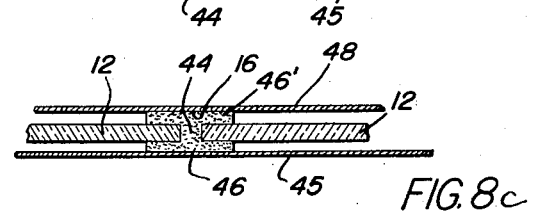
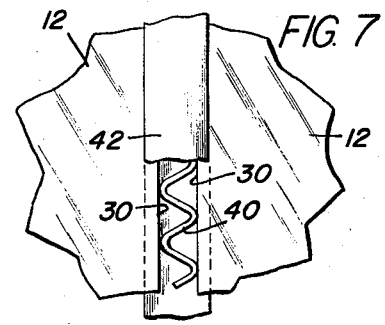
INVENTOR
JAMES WILLIAMS
BY Frederick E. Bromley
ATTORNEY

United States Patent Office 2,991,213
Patented July 4, 1961

2,991,213
METHOD OF PRODUCING A JOINT FOR A STAINED GLASS WINDOW
James Williams, 14 Ostend Ave., Toronto, Ontario, Canada
Filed Apr. 13, 1959, Ser. No. 805,783
4 Claims. (Cl. 154—116)

This invention relates generally to staned glass windows and is more particularly concerned with a novel joint and method of constructing stained glass windows in a ready and expeditious manner.

Conventionally, stained glass windows were formed utilizing lead sealing beads therebetween, these beads being sealed by means of a suitable mastic such as putty or the like, to the adjacent portions of glass making up the window and the resulting extreme weight of the window resulted in constant maintenance and repair. Additionally, the putty, for example, often dried up requiring re-application of the same thus making stained glass windows especially undesirable in this regard.

A primary object of this invention is to provide a novel joint and method for constructing stained glass windows which affords a reduction in glazing time, is exceedingly lighter than conventional leaded stained glass windows facilitating handling and shipping and is extremely flexible at the joints reducing the possibility of breakage.

A further object of this invention is to provide in a novel stained glass window of the character involved which requires no cement between the joints of adjacent portions of the window, and one in which the joints are very stable and are also airtight, waterproof and rattleproof.

A still further object of the invention is to provide a stained glass window utilizing a hard setting polysulphide polymer and accelerator which form a sealing bead having an H-shaped cross section providing flanges adhesively and intimately engaging and rigidifying adjacent portions of a stained glass window.

A further object of the invention is to provide a novel method of constructing a stained glass window which includes the particular manner of applying a hard setting mastic in relation to adjacent coplanar portions of a stained glass window whereby the same may be constructed in a ready and economical manner.

Other objects and advantages of the invention will become apparent during the course of the following description. In the drawing there is shown preferred embodiments of the invention in addition to illustrations of the novel method of the invention.

In this showing:

FIGURE 1 is a plan view of a stained glass window constructed by using the novel joint of the invention;

FIGURE 2 is an enlarged fragmentary transverse section showing a conventional or prior art joint between adjacent edges of a pair of pieces of glass used in a stained glass window;

FIGURE 3 is an enlarged fragmentary section taken on line 3—3 of FIGURE 1;

FIGURE 4 is an enlarged fragmentary section similar to FIGURE 3 showing another embodiment of the novel joint of the invention;

FIGURE 5 is an enlarged fragmentary section similar to FIGURES 3 and 4 showing a still further embodiment of the invention;

FIGURE 6 is an enlarged fragmentary section showing the manner in which the side edge of the stained glass window is constructed;

FIGURE 7 is an enlarged fragmentary plan view showing a still further embodiment of the novel joint of the invention; and FIGURES 8a, 8b and 8c are respective steps illustrating the manner in which the joint of FIGURE 3 is constructed.

Referring to the drawing in detail, indicated generally at 10 in FIGURE 1 is a panel of stained glass including a plurality of various outlined pieces of glass 12, the edges of which forming the rectangular pane of stained glass as indicated at 14 and adjacent edges between the pieces of glass being indicated at 16.

Referring to FIGURE 2, which is illustrative of the prior art, adjacent pieces of glass 18 and 20 are disposed in coplanar relationship with their inner edges 22 and 24, respectively, spaced. A lead bead 26 having an H-shaped cross section is disposed in overlying spaced relation at the adjacent edges 22 and 24 of the pieces of glass, and a suitable mastic 28 such as putty or the like is brushed or inserted therebetween. This construction results in a relatively heavy pane of glass, is quite time consuming in construction and the putty or filling material 28 often dries up, hardens and must be replaced.

Considering FIGURE 3, it will be seen that the adjacent pieces of stained glass 12 are disposed in co-planar relationship, the inner edge portions 30 being retained in spaced relation and are intimately secured by the bead 16 which has an H-shaped cross section. This bead comprises a hard setting of polysulphide polymer with an accelerator, such as that known by the trade name of Thiokol. It will be noted that the novel bead is intimately bonded with the edge portions of the pieces of glass and there is no necessity to use additional adhesives or fillers such as that mentioned above relative to FIGURE 2.

Considering FIGURE 4 the pieces of glass 12 have disposed therebetween a filler strip 32 which may be of butyl tape, for example, and the bead 16' is formed thereabout functioning in the same manner as that mentioned relative to FIGURE 3.

Considering FIGURE 5 the pieces of glass 12 are secured by a sealing bead 16" which has disposed therebetween an elongated thin flat steel reinforcing tape 32'.

Considering FIGURE 6, one of the pieces of glass 12 has secured about its edge a bead 34 which is intimately secured to the edge 36 of the piece of glass, the outer portion of the bead 34 has disposed between the flanges 34' and 34" a filler strip 38.

Considering FIGURE 7, the pieces of glass 12 are disposed in coplanar relationship and extending between adjacent spaced edges 30 thereof is a sinuous metal spacer strip 40 which will retain the pieces of glass in spaced relationship and yet permit the mastic or hard setting sealing material forming the bead 42 to extend therebetween.

It will be noted in FIGURE 3 that the web 44 of the sealing bead compresses merely the hard setting material and has no reinforcement such as those shown in FIGURES 4 and 5. Thus the construction in FIGURE 3 may be utilized with relatively thin pieces of glass forming the stained glass window, whereas the reinforcing means of FIGURES 4 and 5 may be used in heavier constructions.

Referring to FIGURES 8a, 8b, and 8c, in FIGURE 8a a sheet of waxed paper 45 will be disposed in overlying relationship on a pattern such as that shown in FIGURE 1. At the various portions where the beads 16 will be formed a layer of strip material 46 will be deposited on the waxed paper. After this has been done the pieces of glass 12, suitably cleaned, will be disposed in spaced relationship at their edges 30, see FIGURE 8b, pressed down slightly as indicated therein to form a portion of the web 44. Thereafter, an upper strip 46' will be deposited on the construction shown on FIGURE 8c, see FIGURE 8c which will intimately adhere to the edges of the pieces of glass as well as becoming bonded to the strip 46 to form the complete web 44 of the bead 16. After this has occurred an additional sheet of waxed paper 48 may be placed on top of the strip 46' to apply pressure to the bead 16, and after the bead has set or cured sufficiently the waxed paper 45 and 48 may be peeled off.

It is to be understood that the form of the invention shown and described together with the method illustrated is to be taken as a preferred example of the same and that various changes in the construction and method may be made as do not depart from the spirit of the invention or the scope of the appended claims.

What I claim as new is as follows:

1. The method of producing a joint as part of stained glass windows comprising laying out a strip of unset, cold-flowing, hardsetting mastic, applying a pair of pieces of glass in spaced co-planar edge-to-edge relationship on said mastic strip, applying a second strip of similar mastic in juxtaposed relation on said edges of the pieces of glass opposite said first strip, and applying pressure to said mastic strips and forcing the material into the space between the edges of said pieces of glass until they unite to form an H-cross sectioned, integral bead sealingly secured to the adjacent outer surfaces and edges of said pieces of glass.

2. The method of claim 1; said strips of mastic comprising a hard setting, polysulphide polymer and an accelerator.

3. The method of claim 1 including the insertion of a spacing and reinforcing strip between the adjacent edges of the pieces of glass.

4. The method of claim 1 including the disposition of said first strip on a sheet of material peelable therefrom after the strip hardens, and a layer of sheet material peelable from said second strip of mastic is disposed thereon until the strip material hardens.

References Cited in the file of this patent

UNITED STATES PATENTS

| | | |
|---|---|---|
| 1,961,352 | Hall | June 5, 1934 |
| 2,189,138 | Eichner | Feb. 6, 1940 |
| 2,330,855 | Woolf | Oct. 5, 1943 |
| 2,438,685 | Stevens | Mar. 30, 1948 |
| 2,466,963 | Patrick et al. | Apr. 12, 1949 |
| 2,618,959 | Watkins | Nov. 25, 1952 |
| 2,683,678 | Adams | July 13, 1954 |
| 2,837,782 | White | June 10, 1958 |

FOREIGN PATENTS

| | | |
|---|---|---|
| 183,766 | Germany | Apr. 19, 1907 |
| 623,911 | Germany | Jan. 7, 1936 |
| 522,486 | Belgium | Sept. 15, 1953 |

UNITED STATES PATENT OFFICE
CERTIFICATE OF CORRECTION

Patent No. 2,991,213                                              July 4, 1961

James Williams

It is hereby certified that error appears in the above numbered patent requiring correction and that the said Letters Patent should read as corrected below.

Column 2, lines 26, and 27, for "accelerator, such as that known by the trade name of Thiokol" read -- accelerator. The polysulfide polymer may be of the type sold under the trademark --.

Signed and sealed this 13th day of March 1962.

(SEAL)
Attest:

ERNEST W. SWIDER
Attesting Officer

DAVID L. LADD
Commissioner of Patents